US006952455B1

United States Patent
Banister

(10) Patent No.: US 6,952,455 B1
(45) Date of Patent: Oct. 4, 2005

(54) ADAPTIVE ANTENNA METHOD AND APPARATUS

(75) Inventor: Brian Banister, San Diego, CA (US)

(73) Assignee: VIA Telecom, Co., Ltd., San Diego, CA (US)

( * ) Notice: Subject to any disclaimer, the term of this patent is extended or adjusted under 35 U.S.C. 154(b) by 871 days.

(21) Appl. No.: 09/632,081

(22) Filed: Aug. 2, 2000

(51) Int. Cl.$^7$ ................................................ H04B 7/02
(52) U.S. Cl. ...................................... 375/267; 375/299
(58) Field of Search ............................... 375/267, 259, 375/260, 295, 299, 219, 220

(56) References Cited

U.S. PATENT DOCUMENTS 5,781,845 A * 7/1998 Dybdal et al. ................ 455/65
6,434,366 B1 * 8/2002 Harrison et al. .............. 455/69

OTHER PUBLICATIONS

Rashid–Farrokhi, et al., "Transmit Beamforming and Power Control for Cellular Wireless Systems", IEEE Journal on Selected Areas in Communications, vol. 16, No. 8, Oct., 1998, pp 1437–1449.

Harrison, et al. (Motorola) "Open and Closed Loop Transmit Diversity at High Data Rates on 2 and 4 Elements", document #C30–199990817–017, submitted to 3GPP2 Aug. 16–20, 1999, pp 1–5.

* cited by examiner

Primary Examiner—Kevin Burd
(74) Attorney, Agent, or Firm—Martin J. Jaquez, Esq.; Jaquez & Associates; William C. Boling, Esq.

(57) ABSTRACT

A transmitter generates a pair of test weight vectors, each vector comprised of a plurality of complex entries, with each entry corresponding a different one of a plurality of antennae. The first and second complex weight vectors are applied to a dedicated pilot signal during alternate time intervals. During each time interval, the average of the first and second complex weight vectors is applied to the data traffic transmitted by the transmitter. A receiver alternately receives the pilot signal as multiplied by the first and second weight vectors as described above. The receiver determines which of the weighted pilot signals resulted in a stronger signal received at the mobile and, based upon this determination, transmits feedback. The transmitter receives the feedback and updates the first and second weights accordingly

56 Claims, 10 Drawing Sheets

ADAPTIVE ANTENNA METHOD AND APPARATUS

BACKGROUND OF THE INVENTION

1. Field of the Invention

This invention relates to digital wireless communications and more specifically to methods and apparatus pertaining to an adaptive antennae weighting scheme.

2. Description of the Related Art

Digital wireless systems presently being deployed are commonly seen to be forward link (base station ("BS") to mobile station ("MS")) capacity limited. This is due mostly to asymmetric traffic: most data applications, such as web browsing, are envisioned to be sending data to the mobile user on the forward link, while the reverse link might contain only small control packets, i.e. a new IP address to download, so that the forward data rate is much greater than the reverse data rate.

Forward capacity can be increased with an array of antennae in a base station whose individual carrier amplitudes and phases can be adjusted based on feedback from a MS. In particular, a TxAA algorithm will typically transmit the same MS-specific waveform on multiple antennae, applying adaptive complex weights to the baseband signal applied to each antenna. To allow the MS to do coherent demodulation, a dedicated pilot channel will typically be transmitted in the same manner as the data.

While RxAA algorithms at the BS are fairly straight forward, TxAA algorithms are not. The mere definition of an "optimal" TxAA algorithm is not unambiguous as the optimization of one mobile's forward link can degrade another's, leading to complex tradeoffs which are not part of the RxAA problem.

Most TxAA algorithms will require some knowledge of the transmission channel from the BS to the MS. Given this knowledge and a defined "optimality"criterion, the BS can determine the TxAA weights. The difficulty here is that the MS can measure the channel, but it is the BS which needs this information to adjust its transmit weights. Also, there can be some additional complexity in that the mobile which must generally measure the channel of each transmit antenna separately, in addition to measuring the channel of the overall Tx weight adjusted signal, the latter being required for the demodulation of the signal.

Presently, there are a number of proposed methods for implementing TxAA. According to some of these proposals, a few bits are allocated to the MS to encode the channel gain and phase. See Thomas Derryberry, Balaji Raghothaman (Nokia) "Transmit Adaptive Arrays without User Specific Pilot", document # C30-19990817-030, submitted to 3GPP2 August 1999; Mark Harrison (Motorola) "Tx AA Parameter Recommendations", document #C30-19990914-010, submitted to 3GPP2, Tokyo Japan, September 1999; and Mark Harrison, Kiran Kuchi (Motorola) "Open and closed loop transmit diversity at high data rates on 2 and 4 elements", document #C30-19990817-17, submitted to 3GPP2 August 1999. These methods do not allow the desired antenna weights to be precisely determined because the channel state must be distorted in order to be fed back to the BS with a low bit rate.

The academic literature has typically assumed that the full channel information is available at the transmitter, which is not a practical assumption. See, e.g. Jen-Wei Liang, Arogyaswami Paulraj "Forward link antenna diversity using feedback for indoor communication systems" Proceedings, 1995 International Conference on Acoustics, Speech, and Signal Processing, May 1995; Farrokh Rashid-Farrokhi, K. J. Ray Liu, Leandros Tassiulas "Transmit beamforming and power control for cellular wireless systems" IEEE Journal on Selected Areas in Communications, Vol. 16, No. 8 Oct. 1998. There have been several submissions to the TIA standardization body for TxAA algorithms with channel feedback from MS to BS, some of which are referenced above. All of these submissions require the mobile to measure a primary and secondary pilot transmitted from the primary and secondary antennae. Some submissions have shown that 4 antenna transmission can give better performance, with no recognition of the increased complexity at the MS.

The use of a few bits of channel feedback leads to substantial degradation relative to the possible performance, since the feedback requires low bit rate quantization. Also, the mobile must individually measure and transmit information for each antenna; the MS requires extra hardware to perform these functions. Furthermore, the above described methods do not gracefully grow to more antennae.

The above mentioned systems are illustrated in FIG. 1, FIG. 2 and FIG. 3, which illustrate a CDMA system. FIG. 1 shows a transmitter 10 with two antennae, first antenna 12 and second antenna 14. As is shown, different common pilot signals are associated with different antennae. For each user, such as user 0 and user 1, the transmitter 10 includes an adder, 16 and 18 respectively, that adds together a dedicated pilot signal for the user and the forward traffic for that user. Multipliers 20 and 22 multiply the summed signal with complex weights for the first and second antennae 12 and 14, respectively. For each antenna, the weighted user signals are summed by adders 24 and 26 and the result is added by adders 28 and 30 to the pilot signal for that antenna. (It should be noted that FIG. 1 represents a complex baseband equivalent, as no RF modulation stage is shown.)

FIG. 2 and FIG. 3 show possible embodiments for receivers that may be used to receive signals transmitted by the transmitter 10. As shown in FIG. 2, a received signal is divided into three components: one signal corresponding to the dedicated channel, one signal corresponding to the common pilot for the first antenna and one signal corresponding to the common pilot for the second antenna. This division is accomplished by multipliers 32, 34 and 36 and accumulators 38, 40 and 42. A more hardware efficient way is shown in FIG. 3, which employs multiplexer 44 and demultiplexer 46 to alternately select between the signals for the different transmit antennae. This time multiplexed processing saves hardware at the expense of 3dB loss of precision for each channel, which is acceptable given the low bit rate, low precision channel reporting used by the mobile to report these channel estimates to the BS.

The channel estimate the mobile attains is coded into some low bit representation. The bit rates mentioned in the above cited references are 1,2 or 4 bits (1b phase, 2b phase, or 3b phase+1b amplitude). So, for a forward channel vector c, the mobile generates the estimate ĉ, which is then quantized to give the feedback estimate $\hat{\hat{c}}$.

Note that the MS channel estimation hardware of FIG. 2 or FIG. 3 can be used for an arbitrarily large number of Tx antennae, as long as there are unique pilot codes for each antenna and MS knows all of these codes.

Finally, the proposed systems have the MS report the channel estimate based on 1 "path". In the presence of resolvable multi-path due to delayed reflections of the transmitted waveform, particularly for CDMA, there may be more than one path usable to the MS. In order to report the channel for N such paths, the MS to BS feedback rate would have to increase N-fold, and the number of such paths would somehow have to be communicated to the BS. This is not practical, and instead the MS reports the channel estimate for only the strongest path. This discards some useful channel characteristics which could further increase performance under these circumstances.

The algorithm employed by the BS to utilize the received channel information would most likely be a simple matched transmission weighting. That is, the forward weights chosen would be the conjugate of the forward vector channel, so that the weights are $$w = \hat{\vec{c}}^*$$

This formulation maximizes the signal power to the mobile without regard to the locations of the other mobiles. It does not steer nulls to the other mobiles. The channel estimate from a given mobile could be used to determine transmission nulls of the other mobiles, but the coarseness of the channel estimate (no more than 4 bits) makes this ineffective.

To summarize, schemes such as that shown in FIG. 1, FIG. 2 and FIG. 3 have significant drawbacks. In particular, as previously mentioned, the use of a few bits of channel feedback requires quantization which leads to substantial degradation relative to the possible performance. Also, since an MS unit must individually measure and transmit information for each antenna; the MS requires extra hardware to perform these functions. Furthermore, the above described methods do not gracefully grow to more antennae.

SUMMARY OF THE INVENTION

According to the present invention, a transmitter includes hardware and/or software for adaptively updating weights for a plurality of antennae. In particular, according to the present invention, the transmitter generates a pair of test weight vectors, each vector comprised of a plurality of complex entries, with each entry corresponding a different one of a plurality of antennae. Preferably, the first complex weight vector is equal to $$\frac{w_{base} + \beta \cdot v}{\|w_{base} + \beta \cdot v\|}$$

and the second complex weight vector is equal to $$\frac{w_{base} - \beta \cdot v}{\|w_{base} - \beta \cdot v\|},$$

where v is a test perturbation vector comprised of a plurality of complex entries, with each entry corresponding to a different one of a plurality of antennae, $\beta$ is an algorithm constant and $w_{base}$ is a vector that is updated based on feedback received from a receiver, as will be further described below. The first and second complex weight vectors are applied to a dedicated pilot signal during alternate time intervals. During each time interval, the average of the first and second complex weight vectors is applied to the data traffic transmitted by the transmitter.

A receiver (e.g. a mobile station) alternately receives the pilot signal as multiplied by the first and second weight vectors as described above. The mobile determines which of the weighted pilot signals resulted in a stronger signal received at the mobile and, based upon this determination, transmits feedback. The transmitter receives the feedback and updates the first and second weights accordingly. In particular, if the first weight resulted in a stronger signal, $w_{base}$ is updated to become $$\frac{w_{base} + \beta \cdot v}{\|w_{base} + \beta \cdot v\|}$$

(the previous first weight) whereas if the second weight resulted in a stronger signal, w is updated to become $$\frac{w_{base} - \beta \cdot v}{\|w_{base} - \beta \cdot v\|}$$

(the previous second weight). The above described process is repeated with the new $w_{base}$. New test vectors v are generated and applied after each MS channel measurement is made.

BRIEF DESCRIPTION OF THE DRAWINGS

Other objects and advantages of the invention will become apparent upon reading the following detailed description and upon reference to the accompanying drawings in which.

Figure 1:
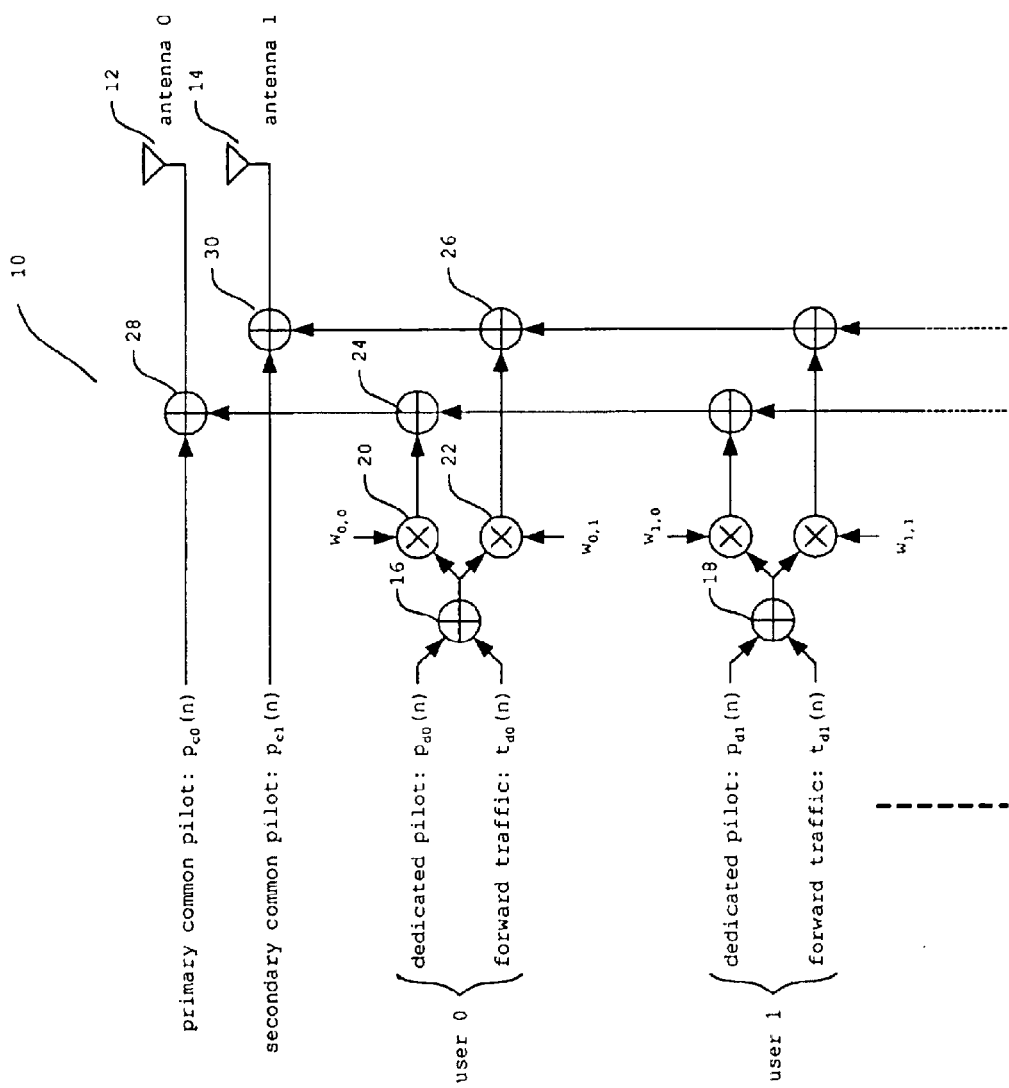
FIG. 1 is a block diagram of one type of a conventional two antenna transmitter that employs antenna weighting derived from receiver feedback
Figure 2:
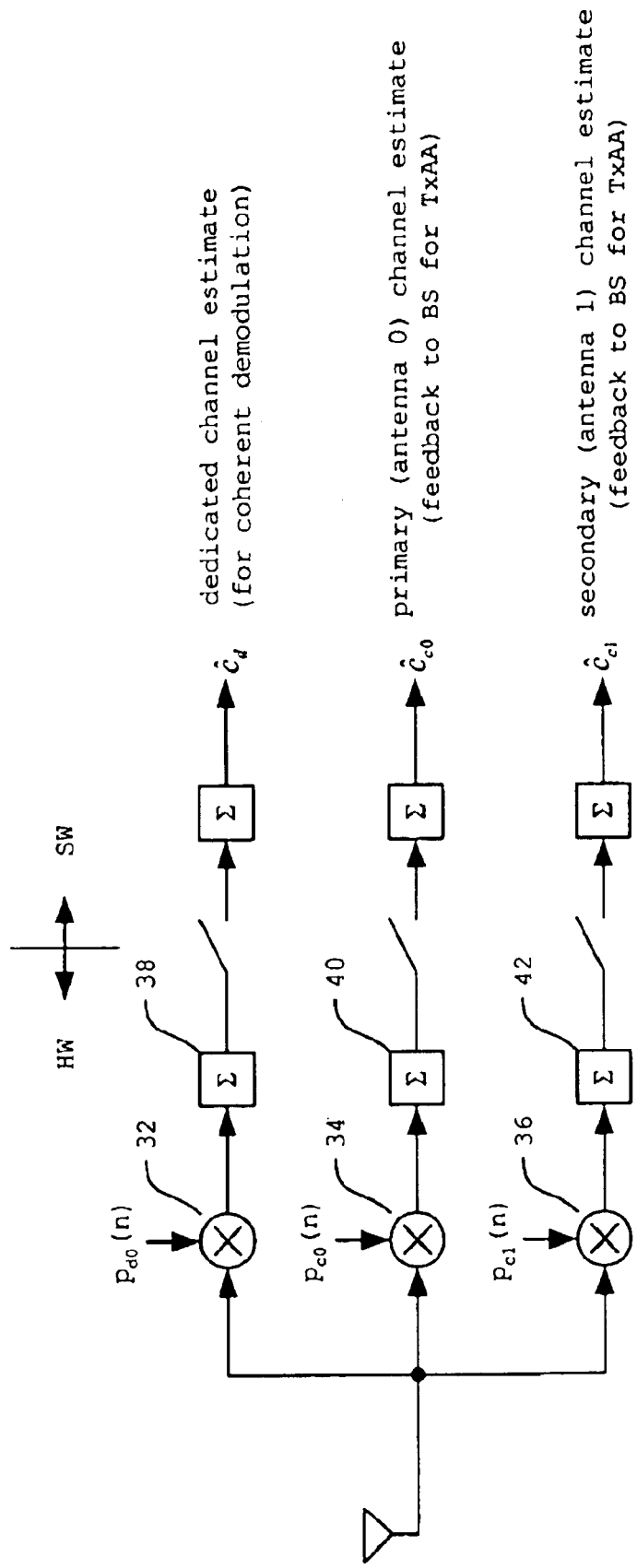
FIG. 2 is a block diagram of one type of conventional receiver that estimates the channel for each transmit antenna individually.
Figure 3:
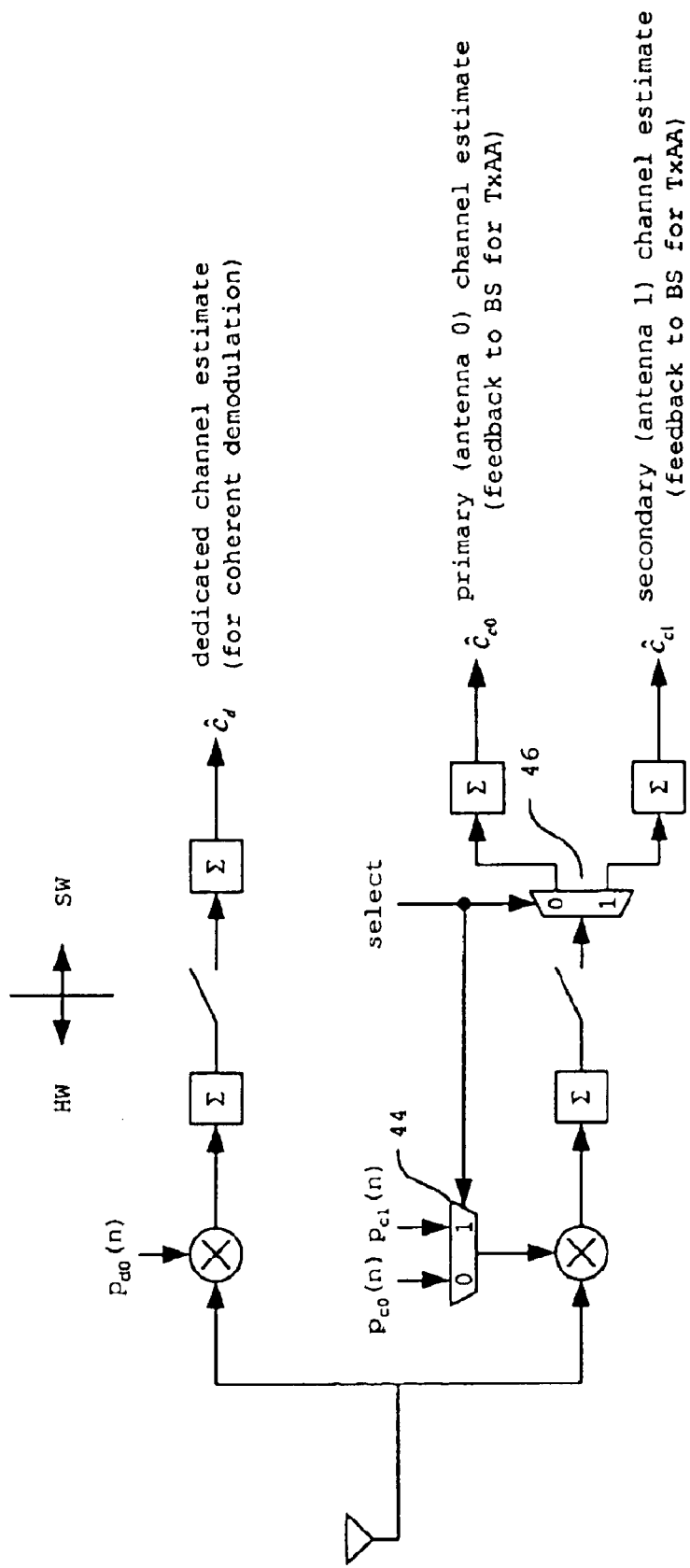
FIG. 3 is a block diagram of an alternate type of conventional receiver that estimates the channel for each transmit antenna individually.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

Figures showing transmission and receive systems omit portions of the radio for convenience (quadrature modulation/demodulation). Those portions of the radio not shown are not relevant to the invention. Signals are represented as complex baseband equivalents, and all arithmetic is complex.

DETAILED DESCRIPTION OF THE INVENTION

Nomenclature

| | |
|---|---|
| AA | adaptive antenna, more generally adaptive antenna algorithm |
| BS | base station, fixed station which communicates with multiple mobile stations and provides their gateway to the fixed network. |
| CDMA | code division multiple access |
| DS-CDMA | direct sequence CDMA |
| forward link | radio link from the transmitting base station to the receiving mobile station |
| HW | hardware, referring to the fixed digital logic portion of a modem as opposed to SW |
| MS | mobile station, a user of the cellular network, e.g. a cell phone or a wireless data terminal |
| pilot | a know signal or "training sequence" transmitted so that the receiver may use it to estimate the channel response. |
| reverse link | radio link from the transmitting mobile station to the receiving base station |
| Rx | receive |
| SW | software, typically to distinguish the (modifiable) SW portion of a modem from the HW |
| Tx | transmit |

Embodiment

For clarity of representation, certain non-essential assumptions are made for this patent application. First, the system described is a DS-CDMA (Direct Sequence, Code Division Multiple Access) system using "pilots" for coherent demodulation. In fact, most modem digital wireless systems include a pilot (sometimes known as a "training sequence" when time multiplexed rather than code multiplexed) used for channel estimation, and any such system could use this invention.

Second, the below described adaptive array transmitter is considered to be a base station and the receiver is a mobile station. This applies to cellular communications. In fact, the mobile station may also have a transmit array operating in the same manner. Also, the system may not be cellular at all, but peer to peer communication such as Bluetooth.

The invention as described can be applied without regard to how many antennae the transmitting BS is using, and in particular the MS does not need to know how many antennae are being used.

Figure 4:
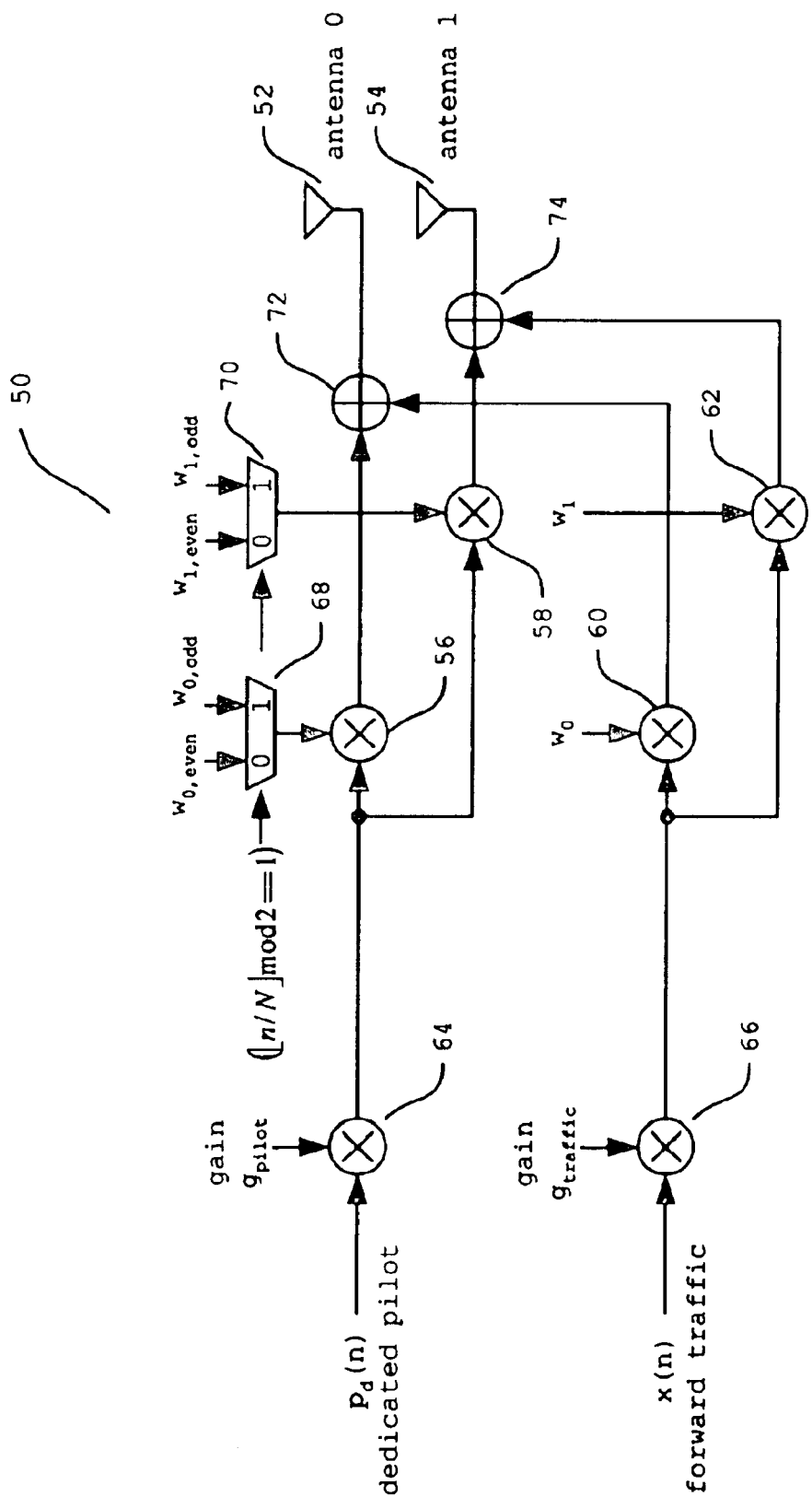
FIG. 4 is a block diagram of an embodiment of a transmitter constructed according to the present invention.

FIG. 4 is a block diagram of a BS transmitter 50 according to a possible embodiment of the present invention. For ease of illustration, two antennae, first antenna 52 and second antenna 54 are shown but it will be appreciated that the present invention may easily be scaled to any number of antennae. Also for ease of illustration, BS hardware corresponding to one mobile unit is shown but the transmitter 50 will typically have analogous hardware for a number of other users.

As shown, the transmitter 50 comprises a plurality of multipliers 56, 58, 60, 62, 64 and 66, summers 72 and 74 and multiplexers 68 and 70. Multipliers 64 and 66 multiply a dedicated pilot signal and a forward traffic signal, respectively, with corresponding gains (real valued). Multipliers 60 and 62 multiply the forward traffic signal by different weights from the weight vector w, $w_0$ and $w_1$, where $w_0$ is the weight for the first antenna 52 and $w_1$ is the weight for the second antenna 54. The weight values will be discussed below. $w_{0,odd}$ and $w_{0,even}$, weights from the weight vectors $w_{odd}$ and $w_{even}$ respectively, are provided as inputs to the multiplexor 68, which alternates between them. Similarly, $W_{1,odd}$ and $w_{1,even}$ weights are provided as inputs to the multiplexer 70, which alternates between them. The weighted traffic and pilot signals are summed by the summers 72 and 74 and transmitted by the first antenna 52 and the second antenna 54 respectively. The mathematical representation of the waveform transmitted by the antennae 52 and 54 will be described below.

Figure 5:
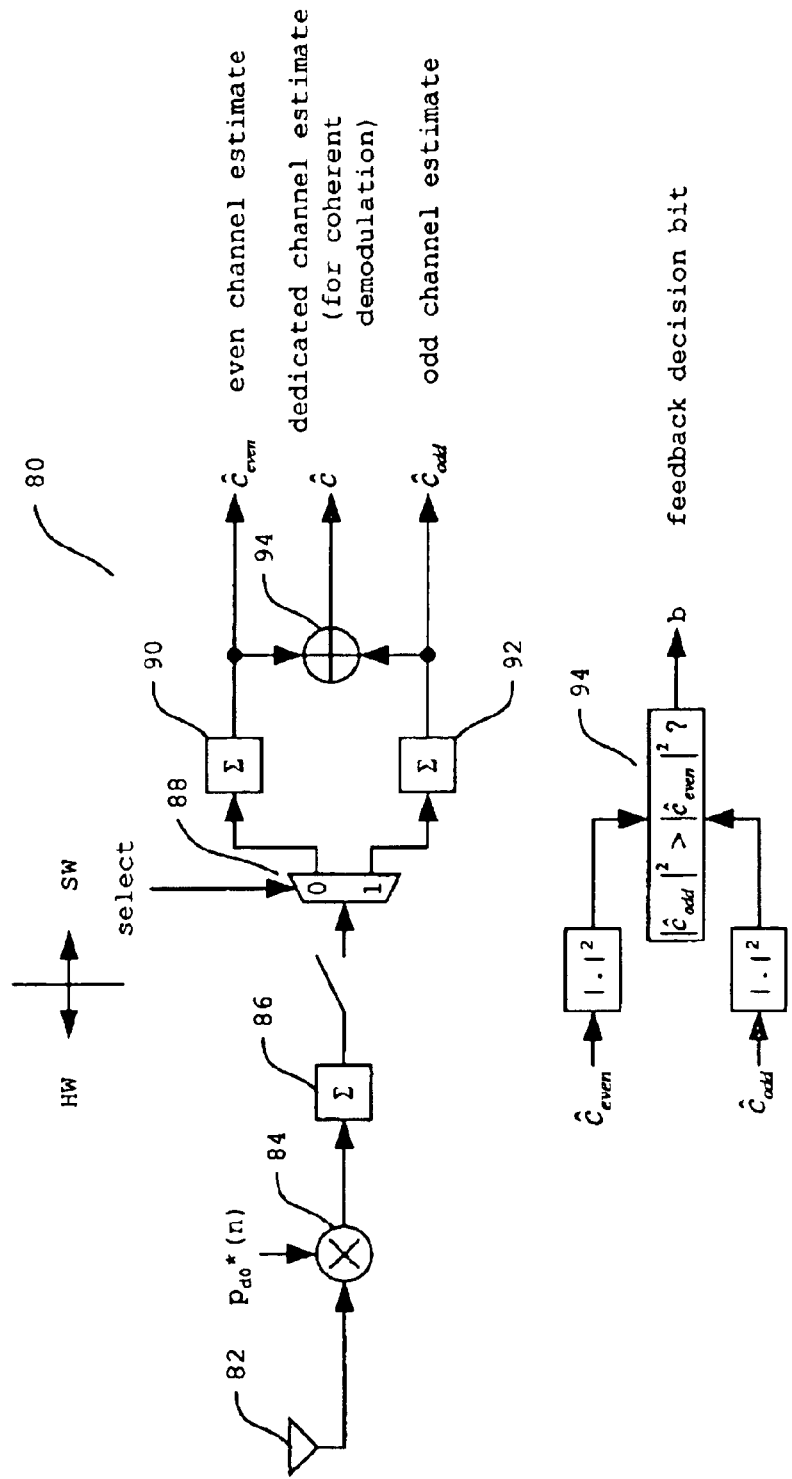
FIG. 5 is a block diagram of an embodiment of a receiver constructed according to the present invention.

FIG. 5 is a block diagram of a MS receiver 80 according to a possible embodiment of the present invention which shows the principle of the feedback decision made by the MS. The receiver 80 comprises an antenna 82, a multiplier 84, and an accumulator 86. The receiver 80 further comprises a demultiplexer 88, accumulators 90 and 92 and a summer 94, which are preferably implemented in software. Signals received over the antenna 82 are multiplied by a pilot despreading code, as is well known in DS-CDMA systems, and the result passed to accumulator 86, which accumulates a symbol from the chips it receives. "Even" and "odd" channel estimates are alternately accumulated in accumulators 90 and 92. The even estimate and odd estimates (i.e. the estimates for the alternating even and odd time slots) are summed by summer 94 to generate a dedicated channel estimate (for coherent demodulation). Also, in decision block 94 the power of the even and odd estimates are compared and the value of a feedback bit is set depending upon which of the two estimates indicates a greater power. In other words, the receiver 80 determines the power of the received pilot in the odd and even time slots, and determines whether the power in the odd or the even slot was greater.

Figure 6:
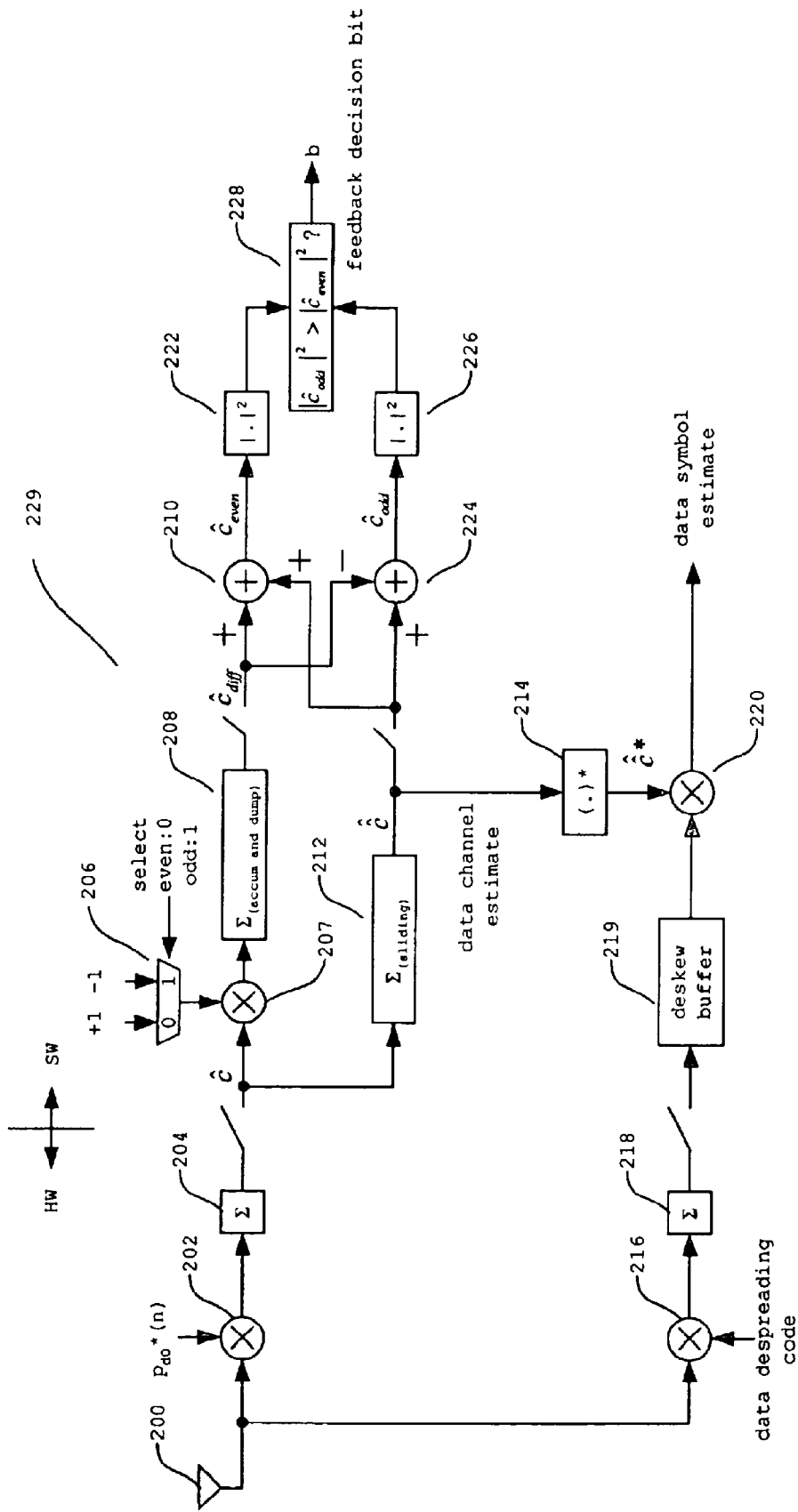
FIG. 6 is a block diagram of a preferred embodiment of a receiver constructed according to the present invention.

FIG. 6 is a block diagram of a preferred embodiment of a receiver (e.g. an MS) 229 constructed according to this invention. This figure illustrates the efficient use of the pilot format to both aid antennae adaptation and to demodulate incoming data. The pilot is used to extract a preliminary channel estimate $\hat{c}$ using the multiplier 202 and the accumulator 204. A sliding window filter 212 maintains the data channel estimate $\hat{c}$. The preliminary data symbol estimates are generated by multiplying the data despreading sequence with the received signal with multiplier 216 and accumulating the result in accumulator 218. These preliminary symbol estimates are then delayed in a deskew buffer 219 and then the data channel estimate $\hat{c}$ is conjugated in conjugation unit 214 and multiplied with the preliminary data symbol estimates with multiplier 220 to generate the final data symbol estimates. A channel difference estimate is simultaneously maintained through a separate data path. The preliminary channel estimate $\hat{c}$ is inverted for odd time and non-inverted for even time slots through the selection of multiplexer 206 and application of ±1 in multiplier 207, with this result accumulated in accumulator 208 to generate $\hat{c}_{diff}$. When the measurement interval is complete, even and odd channel estimates are extracted from $\hat{c}_{diff}$ and $\hat{c}$ using adders 210 and 224. The more powerful channel estimate is then selected in decision block 228.

Note that in the case of resolvable multipath the mobile will be tracking several versions of the received pilot, making channel estimates for each one. In order to properly determine which Tx weight vector gives the best receive power, the mobile combines the channel estimate powers from each path prior to doing the decision comparison. Similarly, if the MS 229 has multiple antennae, the decision would be based on the sum of channel estimate powers over all antennae.

Note also that the same method can be applied to soft handoff, where multiple basestations may be transmitting the same data to the mobile with individually adjusted TxAA weight vectors. That is, the processing of the mobile can be applied to each BS individually, and the odd/even power summations used to determine the feedback bit would be the summation of the powers for each path and for each BS. All BS's would receive the same feedback bit and adjust accordingly. This is almost effectively considering the weight vector to be a concatenation of the individual BS weight vectors, but it must be noted that each BS would individually normalize its weight vector. The described method provides a very simple manner for the TxAA to be distributed across several BS's with no increase in MS complexity.

The following describes in greater detail the operation of the transmitter 50 and receiver 229 described above. Define the following

| | |
|---|---|
| n | time index, at the nyquist rate (chip rate for DS-CDMA) |
| m | time index at decimated (slot) rate, m = ⌊n/N⌋ |
| K | number of users to which the BS is transmitting |
| N | duration of the pilot even/odd banking slot |
| M | number of slots between weight updates |
| u(n) | transmitted vector at time n, [u]$_i$ is the i$^{th}$ antenna. |
| w(n) | antenna complex weights for the specific MS described, data channel |
| w$_{even}$(n) | antenna complex weights for the specific MS described, even pilot channel |
| w$_{odd}$(n) | antenna complex weights for the specific MS described, odd pilot channel |
| x(n) | information bearing modulated signal for the specific MS described |
| p(n) | dedicated pilot for the specific MS described |
| g,pilot/traffic | gain for the pilot/traffic channel for the specific MS described |

The complex baseband representation of the transmitted waveform at the antenna, characterizing the amplitude and phase of the modulated radio carrier transmitted by the antenna (such complex baseband representations are well known, see John Proakis, *Digital Communications*, 1995, Third Edition, McGraw-Hill Inc., New York, N.Y.), is given as follows. The equation adds a subscript k differentiating the signals for the plural mobiles.

$$u(n) = \sum_{k=0}^{k-1} (g_{k,traffic} w_k(n) x_k(n) + g_{k,pilot}((\lfloor n/N \rfloor mod2 = 0) w_{k,even}(n) +$$

$$(\lfloor n/N \rfloor mod2 = 1) w_{k,odd}(n)) p_k(n))$$

For conciseness of presentation, the following text focuses on the present invention's method from the point of view of a specific mobile with an arbitrary index k, and the subscript k is omitted.

In particular, the odd transmit weight is applied to the dedicated pilot on odd time slots and vice versa for the even weights. To ensure proper coherent demodulation, the even/odd weights are preferably constrained by the relation:

$$w(n) = \frac{w_{even}(n) + w_{odd}(n)}{2}$$

It is worth noting that when the odd and even test weights are generated by the perturbation technique described below, then it is valid to consider that $$w_{base}(n) \cong \frac{w_{even}(n) + w_{odd}(n)}{2}$$

and hence one may in that case use $w_{base}(n)$ as the weight vector applied to the data channel.

Figure 7:
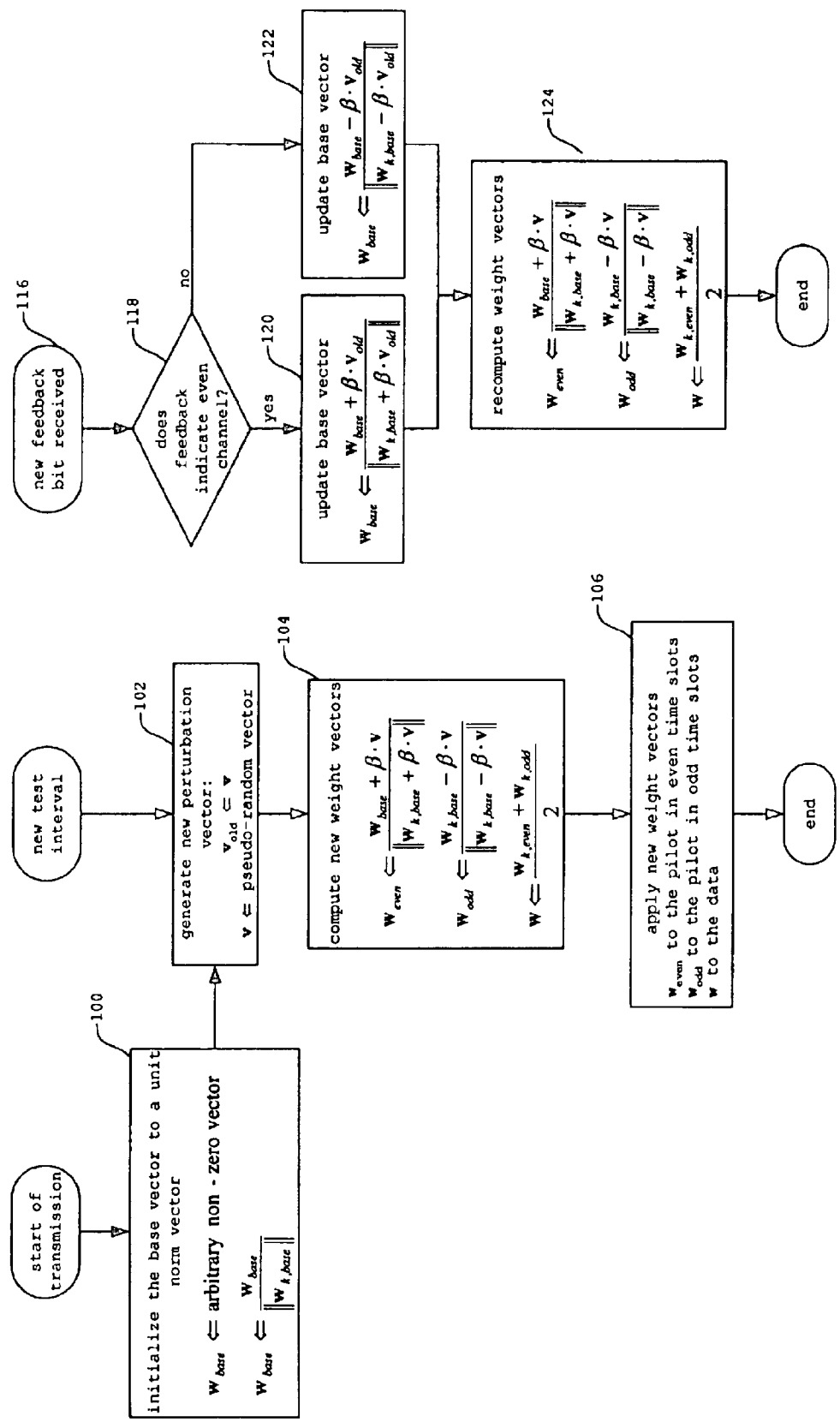
FIG. 7 is a flow chart that outlines pertinent features of the operation of the transmitter shown in FIG. 4.

FIG. 7 is a flow chart that outlines pertinent features of the operation of the transmitter 50. In block 100, a vector $w_{base}$ is initialized to an arbitrary vector with a unit norm. In block 102, a new test perturbation vector v(n) is generated. Each vector entry is a complex number and corresponds to one of the antennae 52 or 54; each such entry therefore corresponds to a test weight to be applied to the transmission of the pilot signal over a particular antenna. The test perturbation vector is preferably determined in a manner such that its entries appear mutually independent. As a point of reference, it is assumed that the expected value (or long term average over many realizations) of the magnitude squared of each entry of v is 2, so that E(∥v∥$^2$)=2·(number of antennae). In this way, the amplitude of the applied perturbation is encompassed in the algorithm parameter β, as described below. For example, v(n) could equal $[\pm 1 \pm j, \ldots \pm 1 \pm j]^T$ (v(n) would have just two entries for the example transmitter of FIG. 4), where the +'s and −'s for the entries are randomly determined. However, the preferred v(n) is a complex Gaussian vector of uncorrelated entries with variance of 2.

In block 102 the current value of v is stored as $v_{old}$ and a new value is determined for v. The old value is stored so that when the feedback is received at a later time (block 116) the transmitter 50 knows which perturbation vector the feedback corresponded to and can adapt accordingly. In block 104, even and odd weights and data channel weights are updated based on the new value for v. This is summarized as follows.

when beginning of test interval $v_{old} \Leftarrow v$ $v \Leftarrow$ normalized test perturbation vector, new value every NM time indices $w_{even} \Leftarrow \frac{w_{base} + \beta \cdot v}{\|w_{base} + \beta \cdot v\|}$ $w_{odd} \Leftarrow \frac{w_{base} - \beta \cdot v}{\|w_{base} - \beta \cdot v\|}$ $w \Leftarrow \frac{w_{even} + w_{odd}}{2}$ //note: the base weight vector is only updated when feedback is received end The normalization of the even/odd weight vectors is applied (the 2-norm is used) so that the total power transmitted in even and odd time slots is equal. This normalization prevents the MS 229 from simply selecting the weight vector with the larger transmit power. Rather, the MS 229 must select the weight vector which delivers the maximum power to the mobile for the given transmit power, which is determined by the traffic and pilot channel gains $g_{traffic}$ and $g_{pilot}$.

In block 106, the weights determined in block 104 are applied to the pilot signal. In particular, $w_{even}$ is applied to the pilot signal during even time slots and $w_{odd}$ is applied to the pilot signal during odd time slots, using the multiplexers 68 and 70 as is shown in FIG. 4. In addition, w is applied to the traffic signal during both even and odd slots. The pilot signal and the traffic signal, as modified according to block 104, are transmitted from the antennae 52 and 54. More precisely, a sinusoidal carrier wave is generated for each of the antennae 52 and 54. Each of these carrier waves is modulated by the traffic and pilot signals (modulating signals) as modified according to block 104. Looked at from another perspective, the weight w adjusts the amplitude and phase of the plurality of radio carrier signals as those carrier signals are modulated by the traffic and pilot signals (modulating signals).

In block 116, which is shown as disjoint from blocks 100–106 for reasons that will be described below, the transmitter 50 receives a feedback bit transmitted by the MS 229. This feedback bit is based on the decision from the MS 229, which indicates which of the even or odd channels resulted in a greater received signal power and determines the weight updates for transmitter 50. In block 118, the transmitter determines whether the even weight yields greater power by checking the value of the feedback bit. (0 is arbitrarily taken to mean the even channel is better). If so, control passes to block 120, which sets equal to $w_{even}$. (In broader terms, $w_{base}$ is a function of $w_{even}$ and $w_{odd}$. In the preferred embodiment, the function is an 'or' type function but more complex functions of weight vectors, including combinations thereof, are conceivable.) Otherwise, control passes to block 122, which sets $w_{base}$ equal to $w_{odd}$. In block 124, the even and odd weights $w_{even}$ and $w_{odd}$ and the data weight w are updated based on the new $w_{base}$. This is summarized as follows when feedback received if (feedback = 0, indicating even channel is better)

$$w_{base} \Leftarrow \frac{w_{base} + \beta \cdot v_{old}}{\|w_{k,base} + \beta \cdot v_{old}\|}$$

else $$w_{base} \Leftarrow \frac{w_{base} - \beta \cdot v_{old}}{\|w_{k,base} - \beta \cdot v_{old}\|}$$

end $$w_{even} \Leftarrow \frac{w_{base} + \beta \cdot v}{\|w_{base} + \beta \cdot v\|}$$

$$w_{odd} \Leftarrow \frac{w_{base} - \beta \cdot v}{\|w_{base} - \beta \cdot v\|}$$

$$w = \frac{w_{even} + w_{odd}}{2}$$

end

As mentioned above, block 116 (and related blocks) are shown as disjoint from blocks 100–106. This is because the processes represented by these two sets of blocks are independent of one another, as can be seen from FIG. 10, a timing diagram that shows a possible timeline for weight adjustment and channel measurement. Waveform 130 shows the timing of updates to $w_{base}$, which are performed in blocks 120 and 122. Waveform 132 shows updates to v, which are performed in block 102. Waveforms 134 and 136 show updates to $w_{even}$ and $w_{odd}$, which are performed in blocks 104 and 124. Waveform 138 shows updates to the data channel weight vector w, which are performed in blocks 104 and 124.

As shown by waveform 132, the test vector v (step 102) is generated periodically and independently of feedback received from the MS 229. The updates to $w_{even}$ and $w_{odd}$ caused by a v are indicated by solid vertical lines in the Figure while the updates to $w_{even}$ and $w_{odd}$ caused by feedback received from the MS 229 are indicated by the dashed vertical lines in the Figure.

The parameter β is an algorithm constant which is to be selected to maximize performance. A large β allows the weight vector to adapt more quickly, but also introduces additional noise on the weight vector applied as a larger adjustment is made. For example, when the weights are settled near their optimal value, each weight is still constantly adjusted by ±βv. Also, β determines the size of the test perturbation applied to the weight vector, and hence will effect both the ability of the MS to correctly determine which test weight vector provides the larger power, and the amount of interference seen by other MS's. A larger, β will cause the difference between the two test weight vectors to be larger, and hence it is more likely that this difference will exceed any noise contributions to the measurement by the receiver 80 or receiver 229. A larger β also causes more "splatter", wherein the antenna pilot transmission test weights are perturbed more from the base weights, which are adjusted towards an optimal value, and hence the odd/even pilots cause more interference to other MS's than the data weight. As an enhancement to the invention, it is possible to individually tune these two effects (i.e. the adaptation rate vs. weight noise tradeoff, and the noise immunity vs. splatter tradeoff) with a $\beta_1$ and a $\beta_2$, as is described later.

Figure 8:
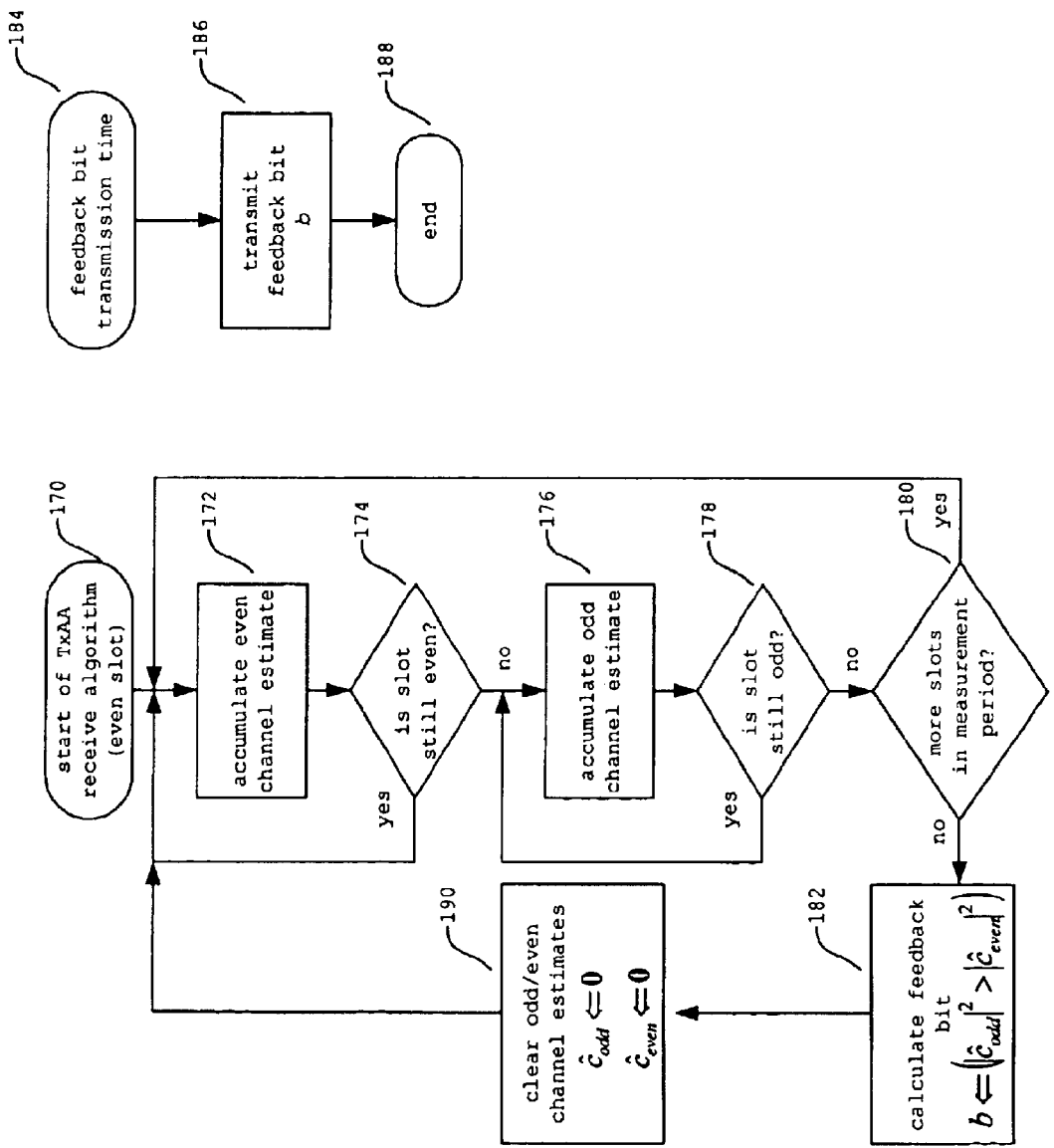
FIG. 8 is a flow chart that outlines pertinent features of the operation of the receiver shown in FIG. 5.

FIG. 8 is a flow chart that outlines pertinent features of the operation of the receiver of FIG. 5. In block 172 the even channel estimate is accumulated, which continues during the entire even time slot according to the decision of block 174. At the beginning of the odd time slot, the odd channel estimate is accumulated in block 176, which continues during the entire odd time slot according to the decision of block 178. The even/odd channel accumulations continue until it is determined by block 180 that the measurement period is complete. When the measurement period is determined to be completed, the feedback decision is calculated and the resultant bit stored for transmission at the appropriate time in block 182. The odd and even channel estimates are then cleared in block 190 and the process is started over for the new measurement period by returning to block 172. At the appropriate time, which is independent of the timing of the channel estimation procedure just described, the MS starts transmission of the feedback bit, which is shown in blocks 184, 186, and 188.

Figure 9:
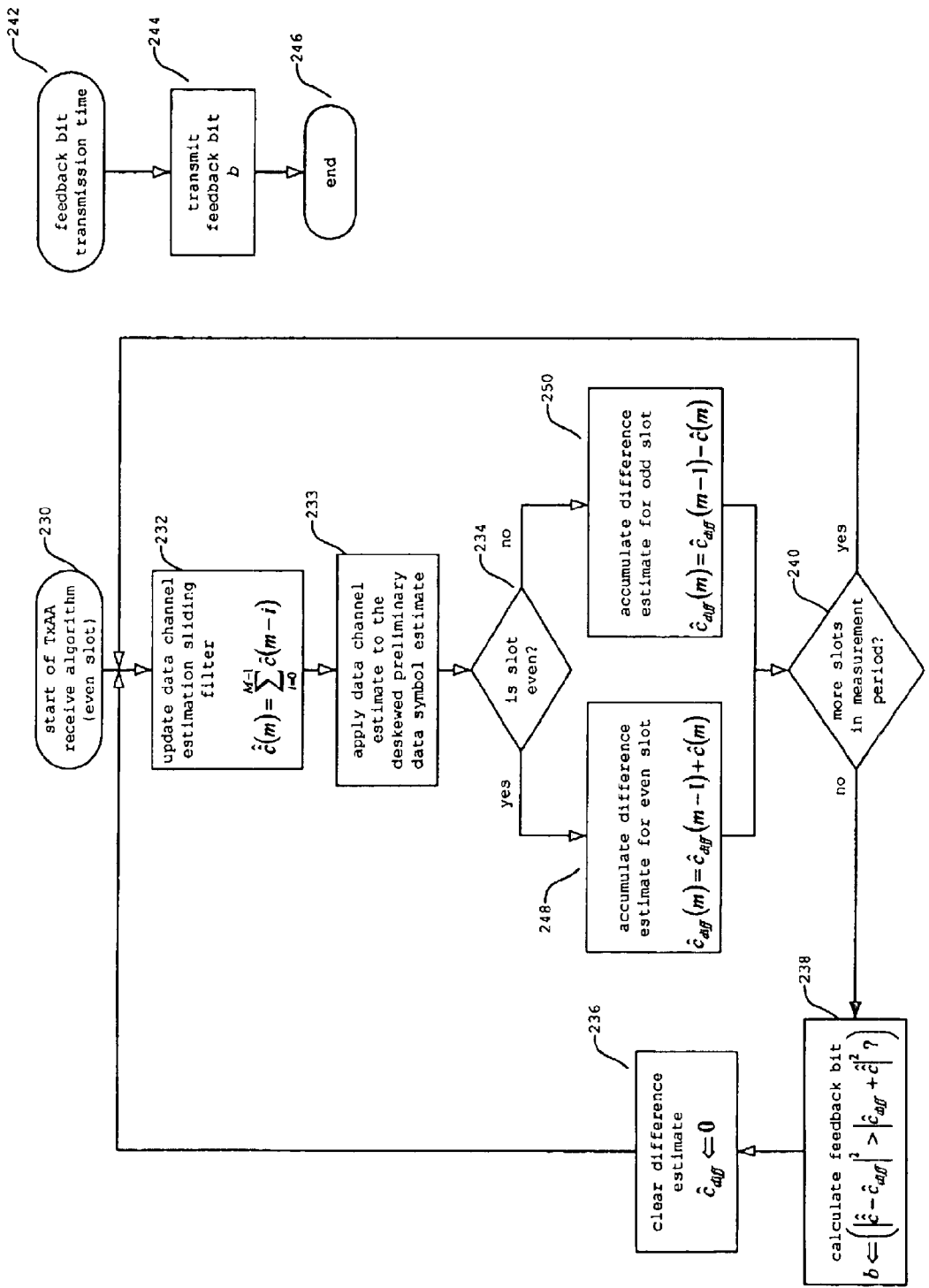
FIG. 9 is a flow chart that outlines pertinent features of the operation of the receiver shown in FIG. 6.

FIG. 9 is a flow chart which outlines the pertinent features of the operation of the receiver of the preferred embodiment of FIG. 6. In block 232 the sliding window data channel estimate is updated. The duration of the sliding window is shown as M slots, covering the duration of a measurement interval, as is preferred. The data channel estimate is applied to the preliminary symbol estimate in block 233. The state of the slot being processed is used in block 234 to determine the sign of the channel difference accumulation by adding the preliminary channel estimate in block 248 if it is an even slot, or subtracting the preliminary channel estimate in block 250 if it is an odd slot. Block 240 determines if the measurement interval is complete, continuing the process by returning to block 232 if the interval is not complete. When the measurement period is determined to be completed by block 240, the feedback decision is calculated and the resultant bit stored for transmission at the appropriate time in block 238. The difference estimate is then cleared in block 236 and the process begins again by returning to block 232. At the appropriate time, which is independent of the timing of the channel estimation procedure just described, the MS 229 starts transmission of the feedback bit, which is shown in blocks 242, 244 and 246.

Figure 10:
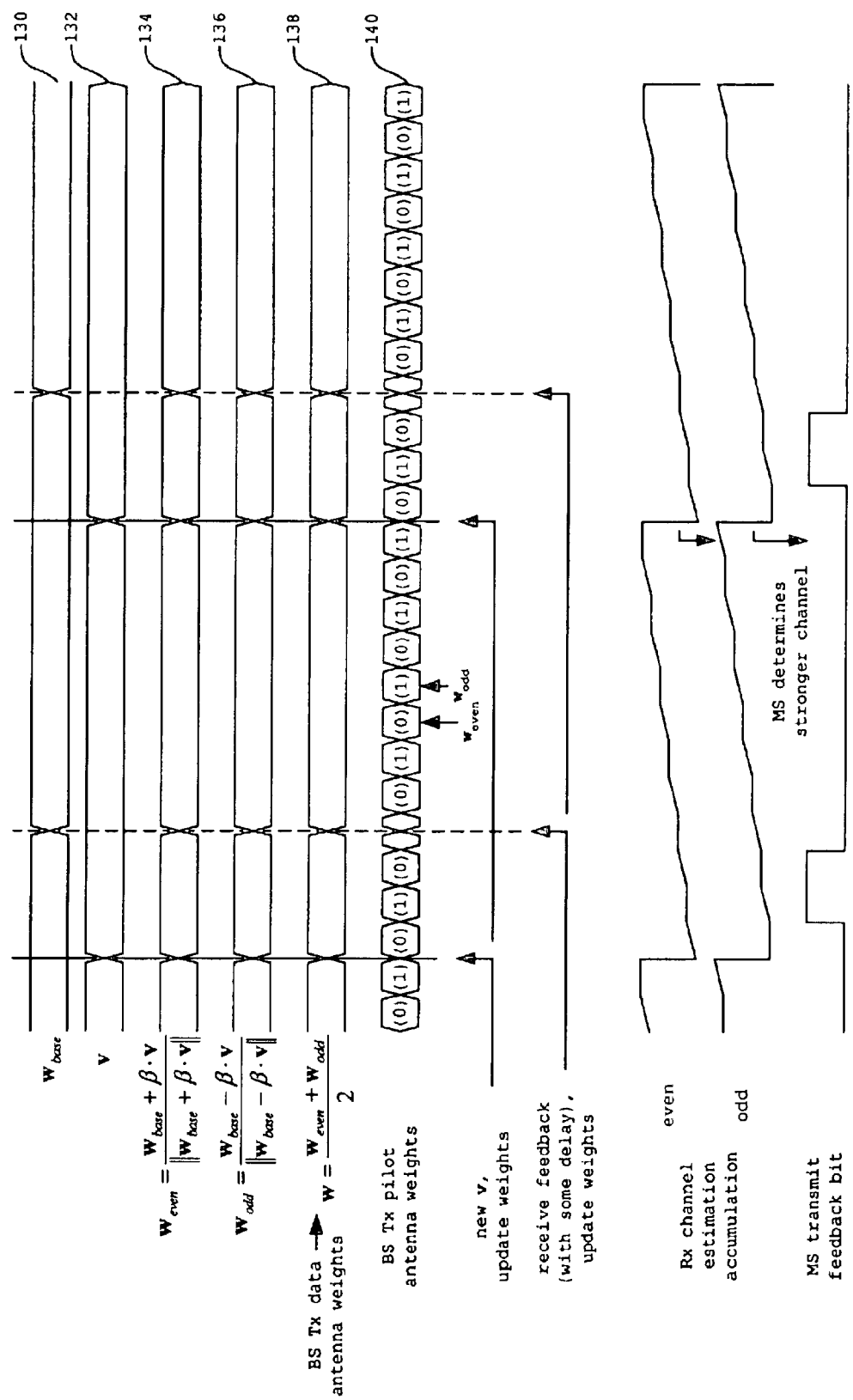
FIG. 10 is a timing diagram that shows a preferred timeline for weight adjustment, channel measurement and feedback.

FIG. 10 shows a time line of this process with certain parameters selected by way of example. The accumulations are of this example are over 12 time slots, the feedback bit is transmitted one time slot later, and the transmit weight update occurs as soon as the transmitter 50 receives it. In this case, the transmitter 50 updates the test perturbation vector v prior to receiving the update, so that the measurement of the new perturbation can begin. Since each update is fairly small, this mechanism allows for the maximization of the measurement time and the measurement of the new perturbation will be insignificantly modified by the overlap.

As previously described with reference to FIG. 7, at the beginning of the each test period, the transmitter 50 determines a new perturbation vector v and applies it to the old $w_{base}$. As soon as the feedback arrives this same new v would be applied to the new $w_{base}$. This allows for maximizing the measurement interval without delaying the next test perturbation. Since the updates are relatively small, the new perturbation will still give a valid measurement result even though it is applied to both the old and the new $w_{base}$.

The invention may be implemented for "soft handoff" systems. Soft handoff in DS-CDMA is an operational mode wherein multiple BS's, each using a different spreading code, are transmitting the same data to a single MS. The reception at the mobile of these multiple signals benefits performance by providing diversity. According to an embodiment of the present invention, soft handoff may be implemented in the following manner. Each BS independently generates test weight vectors $w_{odd}$ and $w_{even}$ through the independent generation of test perturbation vectors v. Each BS transmits the pilot and data as previously described. The MS makes a single decision based on the summation of the channel estimate powers for all BS's, and transmits a single feedback bit as previously described. Each BS independently implements the weight adaptation as previously described, without regard to the fact that it is in soft handoff. In summary, the MS uses the summation of all BS powers for the decision, and each BS behaves exactly as though it would even if not in soft handoff.

The application of the system described as this invention to the IS-95 standard and its derivative cdma2000 would most likely use N=64 chips (chip rate 1.2288 MHz, giving 52.083 us time multiplexing) and 1.25 ms decision intervals. The length of the total even/odd accumulation would be implementation specific in the mobile, but probably 8N, 12N, 16N or 24N (½ of that for each of the even/odd accumulations). Another possible alternative would be 0.625 ms decision intervals, in which case the total even/odd accumulation would probably not exceed 12N. These timings fit well into the existing specification as 64 chips is the original symbol duration from IS-95 and still a common time unit, and 1.25 ms is a "power control group", the timing upon which over the air closed loop power control updates take place, and is 1/16 of the most common frame length, 20 ms. It will be appreciated that the present invention is not limited to any of the specific quantities mentioned above.

Some Alternate Embodiments

It will be appreciated that it is possible to use more than 2 time slots and a corresponding number of test weight vectors, which may be generated from a corresponding number of test perturbation vectors. Also, more than 1 bit could be used as feedback, corresponding to the greater number of time slots.

The generation of the test perturbation v can be done in many ways. Such generation should be pseudo-random so that over the long term the summation $\Sigma vv^H$ approaches an equi-diagonal matrix. The random elements can be generated as some probability distribution other than the binary one described (e.g. uniform distribution, gaussian distribution). Rather than pseudo-random generation, the vector could be generated by cycling through some fixed sequence. For example, the sequence $[1\ 0\ 0\ \ldots\ 0]^T$
$[j\ 0\ 0\ \ldots\ 0]^T$
$[0\ 1\ 0\ \ldots\ 0]^T$
$[0\ j\ 0\ \ldots\ 0]^T$
$\ldots$ could be selected, to scan through each weight independently. This satisfies the requirement on the long term summation of $vv^H$. This scheme, however, will typically result in slower operation.

The value of β could itself be adaptive. For fast varying channels, the value could be made larger, and for slower channels it could be made smaller. This would allow for some optimization of β with respect to channel variation rate.

The weight update can be further parameterized, allowing independent optimization of the adaptation rate vs. weight noise ($\beta_1$) and the measurability in noise vs. splatter ($\beta_2$, tradeoffs. $\beta_1$ is then applied to the update of $w_{base}$, while $\beta_2$ is applied to the test weight vectors $w_{odd}$ and $w_{even}$. This is done as follows.

when feedback received or new interval if (new test interval)

$v_{old} \Leftarrow v$ $v \Leftarrow$ normalized test perturbation function end if (feedback received)

if (feedback = 0, indicating the even channel was better)

$$w_{base} \Leftarrow \frac{w_{base} + \beta_1 v_{old}}{\|w_{base} + \beta_1 v_{old}\|}$$

else $$w_{base} \Leftarrow \frac{w_{base} - \beta_1 v_{old}}{\|w_{base} - \beta_1 v_{old}\|}$$

end end $$w_{even} \Leftarrow \frac{w_{base} + \beta_2 v}{\|w_{base} + \beta_2 v\|}$$

$$w_{odd} \Leftarrow \frac{w_{base} - \beta_2 v}{\|w_{base} - \beta_2 v\|}$$

$$w \Leftarrow \frac{w_{even} + w_{odd}}{2}$$

end

The parameters used in the time line of FIG. 10 are exemplary only and are easily modified.

The exact nature of the feedback channel is not specified. It can be done as a puncturing onto the data channel as the power control bit is done in IS95, or onto the pilot channel as in cdma2000, or in some other manner.

The mobile can generate the channel estimations in a different manner than described.

The weight normalization described above is a total power normalization. Other normalizations can be chosen.

Alternate treatments of soft handoff can be used, though the previously described method is preferred. Rather than using only 1 feedback bit, a feedback bit may be included for each such basestation (or each such BS that has adaptive Tx antennae enabled) so that the mobile can send commands to each, or alternatively can time multiplex the feedback bits between the various BS's. The latter would result in a significant loss of performance to do the slower adaptation times.

The test weights $w_{odd}$ and $w_{even}$ are described as applied in separate time slots. It is possible to use other orthogonal modulation techniques such that they may be extracted. For example, rather than an odd and even time slot, odd and even orthogonal codes (perhaps from a set of walsh codes) could be used. This is not desirable for the preferred embodiment but may be desirable in other embodiments.

While the transmission medium is assumed to be the propagation of radio waves from transmitting antennae to a receiving antenna (or antennae), the invention is obviously extendable to the propagation of waves in other media. For example, the medium could be acoustic waves in a fluid or gas, from transmitting transducers to a receiving transducer (or transducers).

Conclusion

Numerous other variations and modifications will become apparent to those skilled in the art once the above disclosure is fully appreciated. It is intended that the following claims be interpreted to embrace all such variations and modifications.

What is claimed is:

1. A method for transmitting signals from a plurality of antennae at a transmitting unit to a receiving unit, the method comprising the steps of:
   (a) generating a plurality of sinusoidal radio carriers corresponding to each of the plurality of antennae;
   (b) modulating the plurality of sinusoidal radio carriers with a modulating signal;
   (c) during a first time period, adjusting amplitude and phase of the plurality of radio carrier signals corresponding to the plurality of antennae according to a magnitude and angle of a corresponding element of a first test weight vector, $w_{test1}$, comprised of one complex element for each antenna of the transmitting unit;
   (d) creating radio waves by transmitting the plurality of radio carrier signals, as adjusted according to the preceding step and as modulated by the modulating signal, from the corresponding plurality of antennae;
   (e) during a second time period that does not overlap with the first time period, adjusting the amplitude and phase of the plurality of radio carrier signals of a test signal corresponding to the plurality of antennae according to a magnitude and angle of a corresponding element of a second test weight vector, $w_{test2}$, comprised of one complex element for each antenna of the transmitting unit, wherein the second test weight vector is different from the first test weight vector;
   (f) creating radio waves by transmitting the plurality of radio carrier signals, as adjusted according to the preceding step and as modulated by the modulating signal, from the corresponding plurality of antennae; and
   (g) generating a new weight vector, $w_{new}$, based upon feedback received from the receiving unit, as an explicit mathematical function of the first and second test weight vectors.

2. The method according to claim 1 further comprising the steps of:
   (h) adjusting the amplitude and phase of the plurality of radio carrier signals corresponding to the plurality of antennae according to a magnitude and angle of a corresponding element of the new weight vector;
   (i) creating radio waves by transmitting the plurality of radio carrier signals, as adjusted according to the preceding step and as modulated by the modulating signal, from the corresponding plurality of antennae.

3. The method according to claim 1 wherein the first and second test vectors, $w_{test1}$ and $w_{test2}$, are generated as normalized vectors, such that $\|w_{test1}\|=w_{test2}\|$.

4. The method according to claim 3 wherein the norm applied to the first and second test vectors is the 2-norm, said two norm being defined as $$\|a\| = \sqrt{\sum_{\forall k} |a_k|^2},$$

such that a summation of powers of waveforms generated at the plurality of antennae is the same for application of both first and second test weight vectors.

5. The method according to claim 3 wherein the first and second test vectors, $w_{test\ 1}$ and $w_{test2}$, are generated as functions of a first base weight vector $w_{base1}$, where said base weight vector is comprised of one complex element for each antenna of the transmitting unit.

6. The method according to claim 5 wherein the first and second test vectors, $w_{test1}$ and $w_{test2}$, are generated as perturbations from the first base weight vector $w_{base1}$, so that $$w_{test1} = A \frac{w_{base1} + p_1}{\|w_{base1} + p_1\|} \text{ and } w_{test2} = A \frac{w_{base1} + p_2}{\|w_{base1} + p_2\|},$$

where first perturbation vector $p_1$ and second perturbation vector $p_2$ are comprised of one complex element for each antenna of the transmit unit and where scaling factor, A is the same for both first and second test weight vector.

7. The method according to claim 6 wherein the second perturbation vector is inverse to the first perturbation vector, so that $p_2=p_1$.

8. The method according to claim 6 wherein the second perturbation vector is set to zero and the first perturbation vector is non-zero.

9. The method according to claim 6 wherein the second perturbation vector is generated in the same manner as the first perturbation vector, and is generated independently of the first perturbation vector.

10. The method according to claim 6 wherein the first perturbation is generated as a product of a perturbation magnitude scalar $\beta_2$ and a perturbation direction vector v, where the perturbation direction vector v has a fixed average norm B, so that mean $(\|v\|)=B$ and $p_1-\beta_2 v$.

11. The method according to claim 10 wherein the perturbation direction vector v is generated pseudo-randomly.

12. The method according to claim 10 wherein the norm used for the perturbation direction vector v is the 2-norm.

13. The method according to claim 11 wherein the elements of the perturbation direction vector are uncorrelated.

14. The method according to claim 11 wherein each element of the perturbation direction vector is pseudo-randomly selected from a set $\{C\cdot(+1+j), C\cdot(+1-j), C\cdot(-1+j), C\cdot(-1-j)\}$, such that $$v = C \cdot \begin{bmatrix} \pm 1 \pm j \\ \ldots \\ \pm 1 \pm j \end{bmatrix},$$

where j represents a unit magnitude imaginary number, and the scalar C determines an amplitude of the vector.

15. The method according to claim 11 wherein each element of the perturbation direction vector is pseudo-randomly generated as a complex normally distributed variable.

16. The method according to claim 1 wherein the first period of time is comprised of a plurality of non-contiguous time slots.

17. The method according to claim 1 wherein the second period of time is comprised of a plurality of non-contiguous time slots.

18. The method according to claim 16 wherein the second period of time is comprised of a plurality of non-contiguous time slots and wherein the first period of time and the second period of time are selected such that the first test weight vector and the second test weight vector are applied in alternating time slots.

19. The method according to claim 1 wherein the first period of time and the second period of time are known to the receiving unit.

20. The method according to claim 1 wherein the modulating signal is a pilot signal, wherein the pilot signal is known by both the receiving unit and the transmitting unit.

21. The method according to claim 1 wherein the receiver generates feedback indicating which of the two test weight vectors, first test weight vector $w_{test1}$ or second test weight vector $w_{test2}$, generated a larger received test signal power at the receiving unit.

22. The method according to claim 21 wherein the feedback is transmitted from the receiving unit to the transmitting unit as an information bit.

23. The method according to claim 22 wherein the transmitting unit uses the feedback bit transmitted by the receiving unit to generate a second base test weight vector $w_{base2}$.

24. The method according to claim 23 wherein the transmitting unit uses the feedback bit transmitted by the receiving unit to generate a second base test weight vector $w_{base2}$ and wherein the second base test weight vector is set to a value of a test weight vector selected by the receiving unit, either the first test weight vector $w_{test1}$ or the second test weight vector $w_{test2}$.

25. The method according to claim 10 wherein the transmitting unit uses the feedback bit transmitted by the receiving unit to generate a second base test weight vector $W_{base2}$ and wherein the second base test weight vector is generated from the first base test weight and the perturbation direction vector as $$w_{base2} = F \frac{w_{base1} + \beta_1 v}{\|w_{base1} + \beta_1 v\|}$$

if the feedback from the receiving unit indicated that the first test weight vector provided more power to the receiving unit, or is set to be $$w_{base2} = F \frac{w_{base1} - \beta_1 v}{\|w_{base1} - \beta_1 v\|}$$

if the feedback from the receiving unit indicated that the second test weight vector provided more power to the transmitting unit, where $\beta_1$ is a scalar scaling factor and F is a scalar scaling factor.

26. The method according to claim 23 wherein the second base test vector is used to generate subsequent test vectors applied to the antennae of the transmitting unit.

27. The method according to claim 20 wherein the receiver generates feedback indicating which of the two test weight vectors, first test weight vector $w_{test1}$ or second test weight vector $w_{test2}$, generated a larger received test signal power at the receiving unit and wherein a decision by the receiving unit as to which test weight vector generated the larger received test signal power at the receiving unit is generated through the steps of performing a first correlation of a received waveform with the known pilot signal during the first time period, performing a second correlation of a received waveform with the known pilot signal during the second time period, and selecting the test weight vector which generated the larger correlation magnitude.

28. The method according to claim 27 wherein the first and second correlations are generated through the steps of performing a third correlation of the received waveform with the known pilot signal during both the first time period and the second time period performing a fourth correlation of the received waveform with a modified version of the known pilot signal, where the known pilot signal is applied positively during the first time period and is applied negatively during the second time period, obtaining the first correlation as the sum of the third and fourth correlations, obtaining the second correlation as the difference given by the fourth correlation minus the third correlation.

29. The method according to claim 28 wherein the third correlation is obtained as a sliding window correlation.

30. The method according to claim 28 wherein the fourth correlation is obtained as an accumulate and dump correlation.

31. The method according to claim 1 wherein a data signal is transmitted on the plurality of antennae of the transmitting unit with a first data weight vector $w_1$.

32. The method according to claim 31 wherein the first data weight vector $w_1$ is generated as a scaled version of a mean of the first and second test weight vectors, $w_1 = D(w_{test1} + w_{test2})$, where D is a scalar scaling factor.

33. The method according to claim 6 wherein a data signal is transmitted on the plurality of antennae of the transmitting unit with a first data weight vector $w_1$ and wherein the first data weight vector $w_1$ is generated as a scaled version of the first base test vector $w_{base1}$, $w_1 = E w_{base1}$, where E is a scalar scaling factor.

34. The method according to claim 29 wherein a data signal is transmitted on the plurality of antennae of the transmitting unit with a first data weight vector $W_1$ and wherein the third correlation is applied by the receiving unit as a channel estimate to decode the data signal.

35. The method according to claim 1 wherein the transmitting unit is simultaneously transmitting to a plurality of receiving units.

36. The method according to claim 35 wherein the transmitting unit is transmitting test signals, using test weight vectors, to some or all of the plurality of receiving units.

37. The method according to claim 36 wherein the receiving units to which the test signals are being transmitted use those signals to generate feedback.

38. The method according to claim 37 wherein the transmitting unit uses the feedback from those plural receiving units which transmit the feedback to adjust weights of the antennae of the transmitting unit, where said weights are maintained independently by the transmitting unit for each receiving unit.

39. A method for transmitting signals from a plurality of transmitting units to a receiving unit, each transmitting unit having one or more antennae such that the transmitting units as a group comprise a plurality of antennae, the method comprising the steps of:

in each of the plurality of transmitting units, performing the following steps:

(a) generating a sinusoidal radio carrier corresponding to one of the plurality of antennae;

(b) modulating the sinusoidal radio carrier with a modulating signal;

(c) during a first time period, adjusting amplitude and phase of the radio carrier signal according to a magnitude and angle of a first complex number;

(d) creating radio waves by transmitting the radio carrier signal, as adjusted according to the preceding step and as modulated by the modulating signal, from the antenna;

(e) during a second time period that does not overlap with the first time period, adjusting amplitude and phase of the radio carrier signal according to a magnitude and angle of a second complex number, that is different from the first complex number;

(f) creating radio waves by transmitting the radio carrier signal, as adjusted according to the preceding step and as modulated by the modulating signal, from the antenna;

(g) generating a third complex number, based upon feedback received from the receiving unit, by concurrent mathematical manipulation of the first and second complex numbers;

(h) adjusting amplitude and phase of the plurality of radio carrier signals corresponding to the plurality of antennae according to a magnitude and angle of a corresponding element of a new weight vector;

(i) creating radio waves by transmitting the radio carrier signals, as adjusted according to the preceding step and as modulated by the modulating signal, from the antenna; wherein each of the plurality of transmitting units have distinct radio carrier signals, modulating signals, first complex numbers and second complex numbers; and each of the plurality of transmitting units receives the same feedback from the receiving unit.

40. The method according to claim 39 wherein each of the transmitting units comprises at least two antennae, and wherein first and second complex elements for each transmitting unit are part of corresponding first and second test vectors, such that all the first and second test vectors form first and second sets of test weight vectors, $w_{test1}$ and $w_{test2}$.

41. The method according to claim 40 wherein $w_{test1}$ and $w_{test2}$ are generated so that those two constituent vectors that correspond to a single transmitting unit have the same norm.

42. The method according to claim 41 wherein the norm applied to the first and second test weight constituent vectors for each transmitting unit is the 2-norm, such that the summation of the powers of the waveforms generated at the plurality of antennae of any single transmitting unit is the same for the application of both first and second test weight vectors for that transmitting unit.

43. The method according to claim 40 wherein the test weight vectors for each of the plurality of transmitting units are generated in the same manner and are generated independently.

44. The method according to claim 39 wherein the first period of time is comprised of a plurality of non-contiguous time slots, and these slots are the same for each transmitting unit.

45. The method according to claim 39 wherein the second period of time is comprised of a plurality of non-contiguous time slots, and these slots are the same for each transmitting unit.

46. The method according to claim 39 wherein the first period of time and the second period of time are known to the receiving unit.

47. The method according to claim 39 wherein the modulating signal is a pilot signal and each transmitting unit has a different pilot signal, wherein each pilot signal is known by both the receiving unit and the transmitting units.

48. The method according to claim 40 wherein the receiver generates feedback indicating which of two sets of test weight vectors, first set of test weight vectors $w_{test1}$ or second set of test weight vectors $w_{test2}$, generated a larger received test signal power at the receiving unit.

49. The method according to claim 48 wherein the feedback is transmitted from the receiving unit to the transmitting units as an information bit.

50. The method according to claim 40 wherein the first period of time and the second period of time are known to the receiving unit and wherein the receiver generates feedback indicating which of the two sets of test weight vectors, first set of test weight vectors $w_{test1}$ or second set of test weight vectors $w_{test2}$, generated a larger received test signal power at the receiving unit and wherein a decision by the receiving unit as to which test weight vector generated the larger received test signal power at the receiving unit is generated through the steps of performing a first set of correlations of a received waveform with a known pilot signal of each of the transmitting units during the first time period, there being one such correlation for each transmitting unit, forming a first sum of correlations as a sum of powers of the first set of correlations, performing a second set of correlations of a received waveform with the known pilot signals of each of the transmitting units during the second time period, there being one such correlation for each transmitting unit, forming a second sum of correlations as a sum of powers of the second set of correlations, and selecting the set of test weight vectors which generated the larger sum of correlations.

51. The method according to claim 49 wherein each of the plurality of transmitting units uses the feedback bit transmitted by the receiving unit to adjust the complex number corresponding to that transmitting unit.

52. The method according to claim 39 wherein a data signal is transmitted on the plurality of antennae of the plurality of transmitting units with a first set of data weight vectors, with each data weight vector corresponding to one of the plurality of transmitting units.

53. The method according to claim 52 wherein the set of first data weight vectors is generated such that the data weight vector of each transmitting unit is a scaled version of the mean of the first and second test weight vectors for that transmitting unit.

54. A method for transmitting signals from a plurality of transducers at a transmitting unit to a receiving unit through an unconfined medium, the method comprising the steps of:

(a) generating a plurality of sinusoidal radio carrier signals corresponding to each of the plurality of transducers;

(b) modulating the plurality of sinusoidal radio carrier signals with a modulating signal;

(c) adjusting amplitude and phase of the plurality of carrier signals corresponding to the plurality of transducers according to a magnitude and angle of a corresponding element of a first test weight vector $w_{test1}$ and a second test weight vector $w_{test2}$, the first and second test weight vectors comprised of one complex element for each of the plurality of the transducers;

(d) creating waves in the medium by transmitting the plurality of carrier signals, as adjusted according to the preceding step and as modulated by the modulating signal, from the corresponding plurality of transducers;

(e) generating a new weight vector, $w_{new}$, including selecting between the first and second test weight vectors based upon feedback received from the receiving unit, wherein the new weight vector is a function of the first and second test weight vectors;

(f) adjusting amplitude and phase of the plurality of modulated carrier signals corresponding to the plurality of transducers according to a magnitude and angle of a corresponding element of the new weight vector; wherein steps (c) and (d) are performed such that a receiving unit in the medium can determine whether the first weight vector or the second weight vector results in a stronger signal transmitted through the medium to the receiving unit.

55. A method for receiving signals transmitted from a plurality of antennae at a transmitting unit, the method comprising the steps of:

(a) during a first time period, receiving radio waves transmitted by the plurality of antennae, the radio waves resulting from the transmission by the transmitting unit of a plurality of radio carrier signals, corresponding to the plurality of antenna, whose amplitude and phase were adjusted according to a magnitude and angle of a corresponding element of a first test weight vector, $w_{test1}$, comprised of one complex element for each of the plurality of antennae;

(b) during a second time period that does not overlap with the first time period, receiving radio waves transmitted by the plurality of antennae, the radio waves resulting from transmission by the transmitting unit of a plurality of radio carrier signals, corresponding to the plurality of antenna, whose amplitude and phase were adjusted according to a magnitude and angle of a corresponding element of a second test weight vector, $w_{test2}$, comprised of one complex element for each of the plurality of antennae, the second test weight vector different than the first test weight vector;

(c) comparing a power of the radio waves received during the first time period with a power of the radio waves received during the second time period;

(d) transmitting a solitary information unit that indicates whether the power of the radio waves received during the first time period is greater than the power of the radio waves received during the second time period according to the comparison of step (c).

56. A method for transmitting signals from a plurality of transmitting units to a receiving unit, each transmitting unit having one or more antennae such that the transmitting units as a group comprise a plurality of antennae, the method comprising the steps of:

in each of the plurality of transmitting units, performing the following steps:

(a) generating a sinusoidal radio carrier corresponding to one of the plurality of antennae;

(b) modulating the sinusoidal radio carrier with a modulating signal;

(c) creating radio waves by transmitting the radio carrier signal, as modulated by the modulating signal, from the antenna;

(d) receiving a signal information bit as feedback from the receiving unit;

(e) adjusting amplitude and phase of a plurality of radio carrier signals based upon the feedback conveyed by a value of the single information bit;

(f) creating radio waves by transmitting the radio carrier signals, as adjusted according to the preceding step and as modulated by modulating signal, from the antenna; wherein each of the plurality of transmitting units have distinct radio carrier signals and modulating signals; and each of the plurality of transmitting units receives the same information bit from the receiver.

* * * * *